(12) United States Patent
Schaer et al.

(10) Patent No.: US 7,255,223 B2
(45) Date of Patent: Aug. 14, 2007

(54) MIXTURE WITH A SMOOTH THROUGHPUT

(75) Inventors: Richard Schaer, Wittenbach (CH); Stefan Rutishauser, St. Gallen (CH)

(73) Assignee: Buehler AG, Uzwil (CH)

( * ) Notice: Subject to any disclaimer, the term of this patent is extended or adjusted under 35 U.S.C. 154(b) by 0 days.

(21) Appl. No.: 10/509,818

(22) PCT Filed: Feb. 20, 2003

(86) PCT No.: PCT/CH03/00129

§ 371 (c)(1),
(2), (4) Date: Feb. 28, 2005

(87) PCT Pub. No.: WO03/084846

PCT Pub. Date: Oct. 16, 2003

(65) Prior Publication Data

US 2005/0236257 A1    Oct. 27, 2005

(30) Foreign Application Priority Data

Apr. 10, 2002 (DE) .............................. 102 15 806

(51) Int. Cl.
*B65G 33/30* (2006.01)
(52) U.S. Cl. ................ 198/662; 198/493; 198/498; 198/625; 198/659; 198/663; 198/664; 198/670; 198/676
(58) Field of Classification Search ............. 198/493, 198/498, 625, 662, 663, 664, 659, 676, 670
See application file for complete search history.

(56) References Cited

U.S. PATENT DOCUMENTS

| 2,806,680 | A | * | 9/1957 | August ..................... 366/16 |
| 3,570,654 | A | | 3/1971 | Hill |
| 3,884,451 | A | | 5/1975 | Stenmark et al. |
| 3,980,013 | A | * | 9/1976 | Bredeson ................. 100/117 |
| 4,187,030 | A | * | 2/1980 | Godley ..................... 366/319 |
| 4,193,696 | A | | 3/1980 | Van Heel et al. |
| 4,362,272 | A | * | 12/1982 | Martin ....................... 239/7 |
| 4,467,967 | A | * | 8/1984 | Martin ..................... 239/662 |
| 5,738,935 | A | | 4/1998 | Turk et al. |

FOREIGN PATENT DOCUMENTS

| DE | 627 045 | 3/1936 |
| DE | 20 15 461 | 11/1970 |
| DE | 35 19 291 | 12/1986 |
| EP | 0 930 250 | 7/1999 |
| EP | 1 084 808 | 3/2001 |
| FR | 1 181 359 | 6/1959 |
| GB | 1 400 142 | 7/1975 |
| GB | 1 474 484 | 5/1977 |

* cited by examiner

*Primary Examiner*—Gene O. Crawford
*Assistant Examiner*—Leslie A. Nicholson, III
(74) *Attorney, Agent, or Firm*—Jordan and Hamburg LLP

(57) ABSTRACT

A transport device for transporting a transportable product, especially a bulk-type product, includes an essentially cylindrical chamber containing at least one shaft which extends along the cylindrical chamber and comprises a plurality of first transport elements for transporting products in a product transport direction. The transport elements extending radially outwards from the shaft and are respectively connected to the shaft at connection points on the surface thereof. The individual connection points are located along a helical line on the surface of the shaft and the plurality of first transport elements form a first path which corresponds to the helical line and comprises a first discontinuous section extending in a helical manner around the surface of the shaft. Other elements are arranged at least in partial regions of the first path, such elements protruding into the first path.

21 Claims, 3 Drawing Sheets

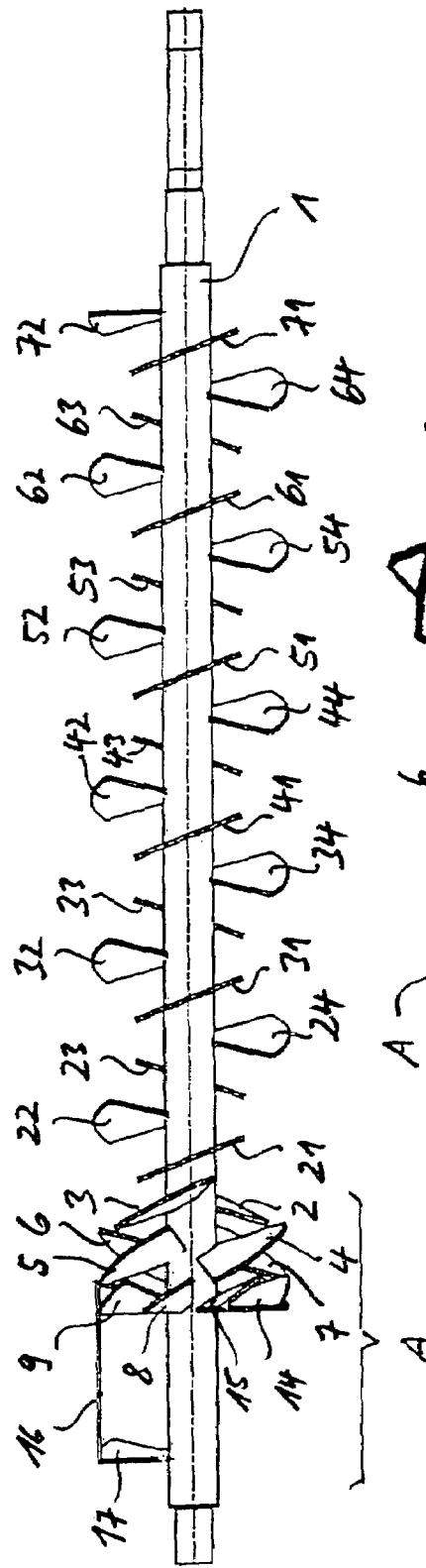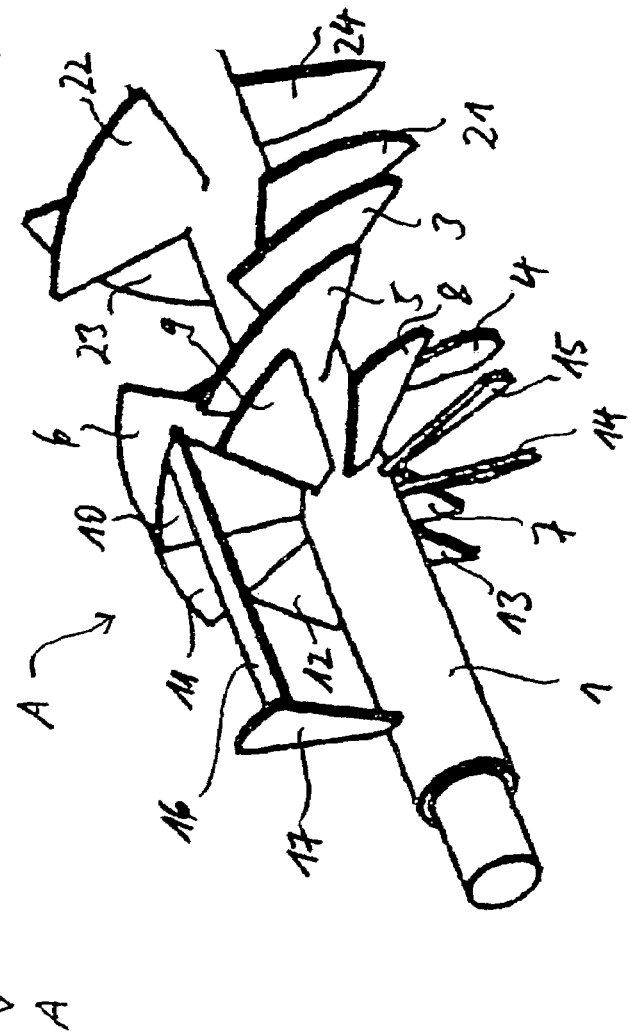

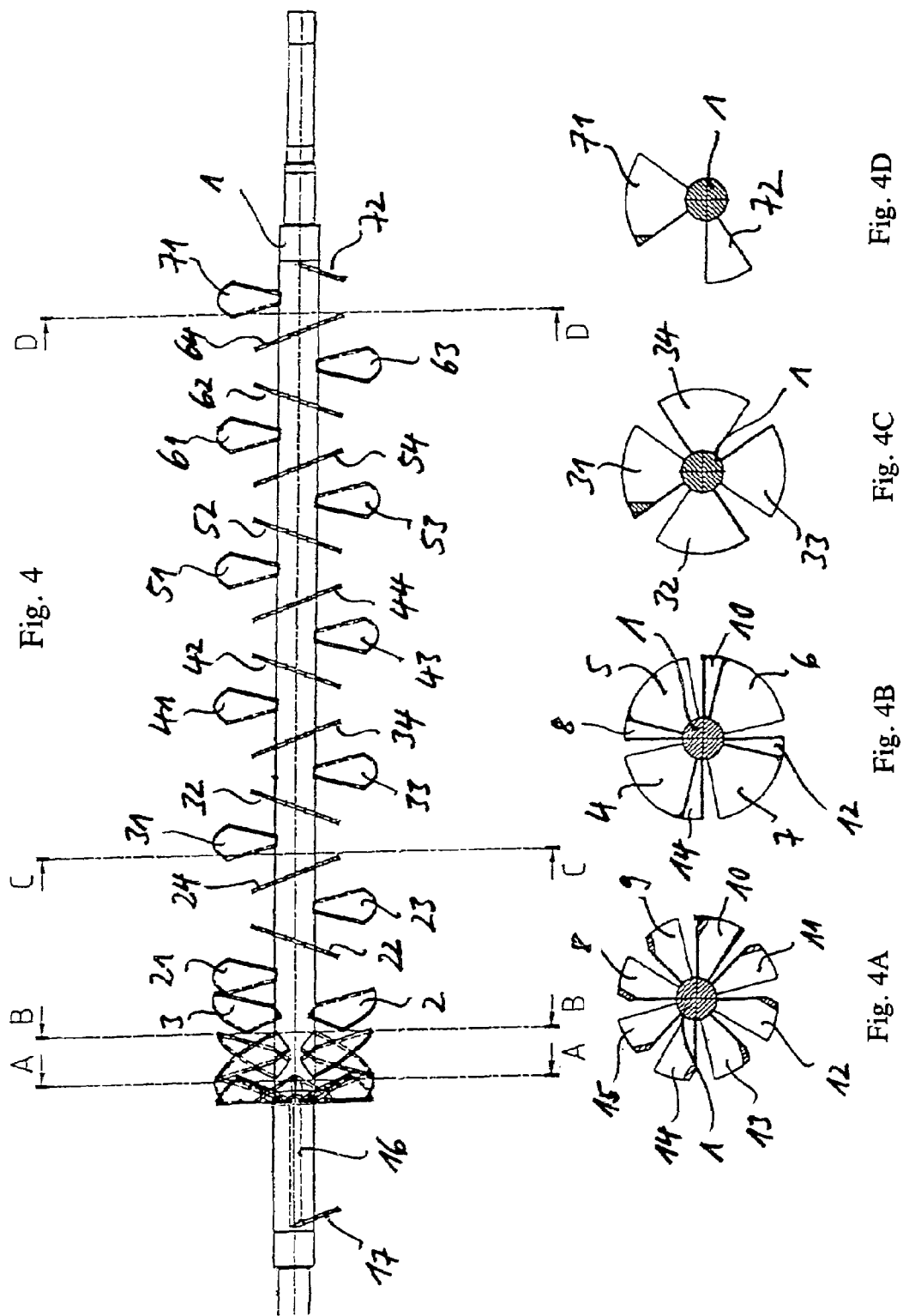

MIXTURE WITH A SMOOTH THROUGHPUT

BACKGROUND OF THE INVENTION

The invention relates to a conveying device for transporting a conveyable product, particularly a flowable product, with an essentially cylindrical chamber, in which at least one shaft is disposed, which extends along the axis of the cylinder, each shaft having a plurality of first conveying elements for transporting the product in a product-conveying direction, which extend radially from the shaft and are connected with the shaft in each case at a connecting site on the surface of the shaft, the individual connecting sites being disposed along a helical line at the surface of the shaft and the plurality of first conveying elements forming a first flight, corresponding to the helical line, with a first so-called discontinuous web, which extends helically about the surface of the shaft. This discontinuous web or "quasi web" consists of conveying elements, which are disposed along a helical line at the shaft.

Such conveying devices are used, for example, for preparing starting materials for the production of foods or feeds. The products to be transported are, for example, starting materials, which usually are grainy or flaky products, optionally moistened with water and partly soaked, which are then processed in further steps into food or feed products. These further steps take place, for example, in an extruder, a flake-forming rolling mill or in a pellet press.

During the conveying of such or similar flowable products by the conveying device named above, compacting of the product into plug-like accumulations, which emerge intermittently at the outlet of the conveying device and, with that, lead to a non-uniform ejection of the product at the outlet of the conveying device named above, takes place increasingly during the transport of the product by means of the conveying elements. This non-uniformity of the product flow then continues in the further steps of the process of product preparation and product processing and leads, on the one hand, to non-uniform processing of the product and, on the other, to non-uniform loading or even overloading of the machines in the further processing steps. In any case, an optimum, continuous process cannot be conducted in this way.

SUMMARY OF THE INVENTION

It is therefore an object of the invention to even out the ejection of product at the outlet of the conveying device named above.

This objective is accomplished owing to the fact that, in the case of the conveying device named above, further elements, which protrude into the first flight, are disposed at least in partial regions of the first flight. These further elements bring about a repeated division of possible product accumulations, which may be formed during the conveying of the product in the flight. By means of this repeated "cutting up" of product accumulations, during which the divided partial accumulations of the flowable product usually are also moved away from one another, the aimed-for evening out of the transport of the product by the inventive conveying device takes place, above all, however, at the outlet of the device, so that the pulsating ejection of product of the state of the art is evened out.

Advisably, the further elements are also conveying elements for transporting product. However, since these further conveying elements are disposed within the flight, they bring about the conveying of only a portion of the product accumulations in the respective flight. This leads to a spatial separation of this part from the respective product accumulation. Since this partial further transport of product accumulations by means of additional conveying elements in the whole conveying device takes place repeatedly, the ejection of product is evened out.

Preferably, the further elements form at least one further, discontinuous web, which extends along and within the first flight in such a manner, that the first flight is divided into at least two partial flights in partial regions. This leads to a largely symmetrical division of the product accumulations and finally to a uniformly evened out product ejection.

In the case of an advantageous embodiment, the number of further, discontinuous webs and, with that, the number of partial flights increases in the conveying direction of the product. This makes possible a constantly increasing division of the product accumulations formed in the transporting path within the conveying device, so that a highly evened out ejection of product with only a slight "residual unevenness" is achieved.

If necessary, regions with a larger number and regions with a smaller number of discontinuous webs can follow one another in the direction, in which the product is conveyed, or regions with an increasing number and regions with a decreasing number of discontinuous webs can follow one another in the direction in which the product is conveyed. By these means, product accumulations with a possibly accompanying compaction can be built up or broken down during the transport of the product through the conveying device. For some products, this is helpful for the incorporation or for the action of a fluid, such as water and/or steam, as well as for supplying thermal energy along the product-conveying segment.

In the case of a further advantageous embodiment, the slope of the first flight increases in the product-conveying direction. At least up to a pitch of 45°, the increasing slope brings about an increasing conveying action, which also counteracts a possible compaction of the product along the product-conveying path and thus contributes to an evening out of the product ejection.

Here also, regions of larger slope can follow regions of small slope of the first flight in the product-conveying direction, or regions of increasing slope can follow regions of decreasing slope of the first flight in the product-conveying direction. In much the same way as with the different number of webs mentioned above, product accumulations, possibly with an accompanying compaction, can be built up or broken down by these means during the transport of the product by the conveying device.

The conveying elements may be constructed as paddles or as beaters. These essentially flat elements are structurally particularly simple, and, aside from their conveying effect and because of their angle of inclination, also have a dividing ("cutting") effect when they take hold of a possible product accumulation during the conveying.

The conveying elements can also be shaped in the form of blades and can therefore be adapted to the transporting or flowing behavior of the flowable product.

In a particularly advantageous construction, at least a first part of the conveying elements is in the form of paddles or beaters and a further part of the conveying elements is shaped blade-like. This enables the transporting and dividing effects to be optimized by the conveying elements.

For all of the versions named above, it is advantageous if the first conveying elements, connected along the helical line on the surface of the shaft with the shaft and forming the first discontinuous web, and the further elements, disposed at least in partial regions of the first flight, are disposed in such a manner that a product volume, which is contained in the cylindrical chamber and, because of a rotation of the shaft, is moved a short distance further by means one of the first conveying elements in the product-conveying direction on a product path in the chamber, is divided and moved apart by at least one element of the further elements crossing the product path, before this product volume is taken hold of and moved further by at least one other of the first conveying elements. This further movement only after a prior division and moving apart of possible product accumulations prevents a greater accumulation of product and, accordingly, has a positive effect on the evening out.

Advisably, the number of flights increases in the product-conveying direction from one flight up to a maximum of eight flights. Because of the inherent volume (necessary blade thickness×blade area) of the individual conveying elements, a further increase in the maximum number of flights would decrease the free, available volume in the conveying direction too much and thus favor the compaction of the product in the outlet region and therefore be counterproductive. The adhesion of the product to the walls of the conveying element is a further limiting factor.

The first conveying elements are always disposed at the shaft in such a manner, that the place, to which a product volume is shifted in the product-conveying direction by contact with one of the first conveying elements because of the rotation of the shaft, after a particular first angle of a rotation of the shaft, comes into contact with another of the first conveying elements further downstream at the shaft, in order to be shifted further in the product-conveying direction.

The axially adjacent conveying elements advisably are disposed offset to one another by 90° at the shaft. This 90° division or division into quarters has proven to be a particularly advantageous, clearly arranged geometry for the conveying shaft with the conveying elements.

Preferably, the above mentioned, specific angle of rotation is greater than 90°. This decreases the conveying effect at the same rpm in comparison to that of a specific angle of rotation of 90°, as a result of which the residence time in the conveying device is increases. For this reason, it is even more advantageous if the specific angle of rotation is greater than 180°. For a particularly advantageous embodiment, the specific angle of rotation is greater than 270° and especially 270°. The resulting conveying effect is even less here. On the other hand, however, the residence time is longer.

Instead of the above-mentioned division into quarters, with axially offset conveying elements at the peripheral angular positions of 90°, 180° and 270° of the shaft, divisions into five or six parts can also be used with the corresponding peripheral angular positions of 72°, 144°, 206° and 278° or of 60°, 120°, 180°, 240° and 320°.

Regions with a different number of starts (discontinuous or quasi flights) are determined by the first conveying elements and the further conveying elements along the product-conveying direction at the shaft. If necessary, the number of starts increases in the product-conveying direction, the number of starts from a first axial shaft section to a downstream, adjacent further shaft section doubling or increasing by one flight from a first axial shaft section to a downstream, adjacent, further shaft section, especially in the product-conveying direction at the shaft.

In much the same way as the first conveying elements, the further elements at the shaft preferably are disposed in such a manner, that the place to which a portion of the product volume is shifted in the product-conveying direction by contact with one of the further elements because of the rotation of the shaft, after a particular further angle of a rotation of the shaft, comes into contact with another of the further elements further downstream, in order to be shifted further in the product-conveying direction, the further angle of rotation being smaller than the first angle of rotation.

The invention also relates to a pre-conditioner for pre-conditioning a flowable product, capable of absorbing liquids, with a mixing chamber, which is designed for wetting the product with the liquid, especially with water and/or steam, and a residence chamber, which is designed for permitting the liquid to act on the product, characterized in that the residence chamber is a conveying device of one of the above paragraphs. Due to the evening out of the transport of the product through the residence chamber and of the ejection of the product at the product outlet, suction is also developed in the residence chamber, which acts on the vapors, such as water vapor, admixed in the mixing chamber and draws these into the mixing chamber. This leads to improved wetting and a better thermal import of heat into the mixing chamber.

Finally, the invention also relates to a method for transporting a conveyable, especially a flowable product by means of a conveying device of one of the above paragraphs, characterized in that a product volume, contained in the cylindrical chamber, is moved a short distance further because of a rotation of the shaft by means of a conveying element of a first group of conveying elements in the product-conveying direction on a product path in the chamber and is divided and moved apart by at least one element of a group of further elements crossing the product path, before at least a portion of this product volume is taken hold of and moved further by at least one other of the first conveying elements. In this connection, the dividing effect of the conveying element dominates over its conveying effect, so that an evening out is largely achieved.

Accordingly, the invention enables the conveying effect to be adjusted optimally by:

1) the number of webs (continuous) or quasi webs (discontinuous) along the shaft,
2) the slope of the webs (continuous) or of the quasi webs (discontinuous) along the shaft,
3) the division of the webs (number) of the conveying elements along 360° angle in the circumferential direction of the shaft) and
4) the angle of inclination and the shape of the conveying elements (blades, paddles, scoops).

Further advantages, distinguishing features and possible application of the invention arise out of the following, non-limiting description of a preferred example of the inventive conveying device by means of the drawings.

BRIEF DESCRIPTION OF THE DRAWINGS

FIG. 2 shows a side view of the shaft of FIG. 1;

FIG. 3 shows a perspective view of the outlet end region of the shaft of FIG. 1 on an enlarged scale;

FIG. 4 shows a side view of the shaft of FIG. 1; and

FIGS. 4A-4D shows sections along the planes A-A, B-B, C-C- and D-D respectively.

DESCRIPTION OF THE PREFERRED EMBODIMENTS

Figure 1:
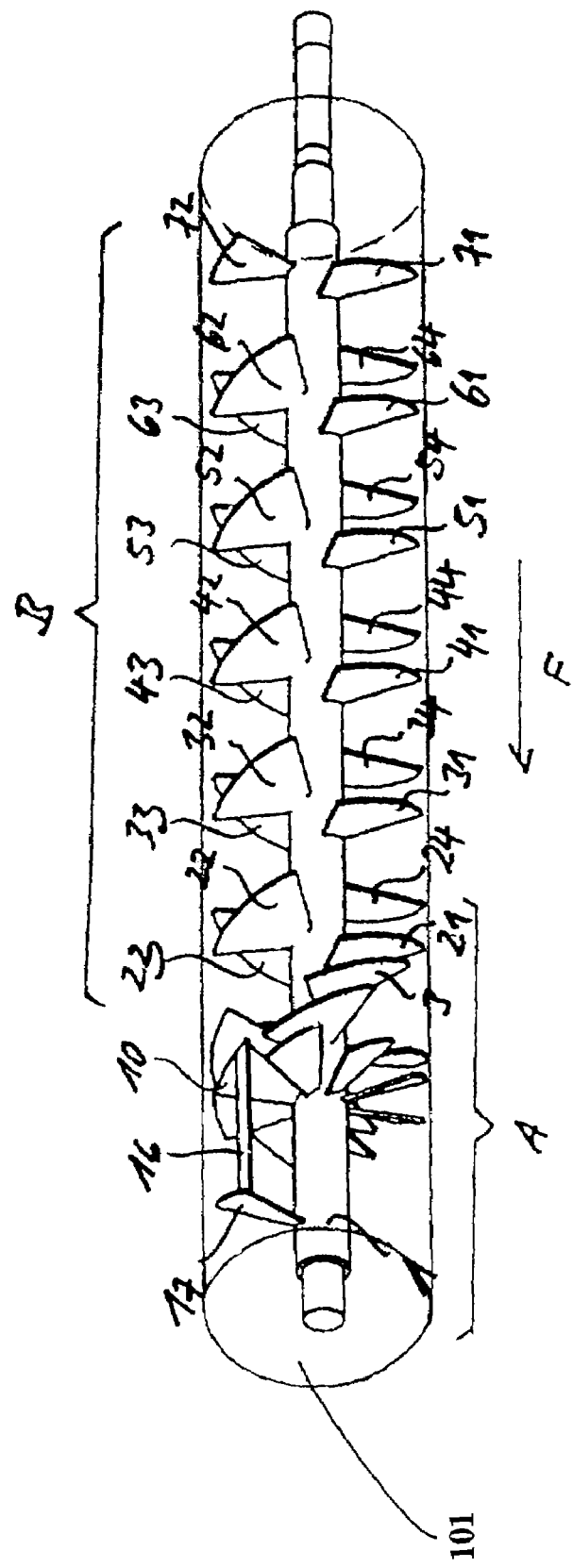
FIG. 1 shows a perspective view of the shaft of the inventive conveying device, which is equipped with conveying elements.

FIG. 1 is a perspective view of the shaft of the inventive conveying device, equipped with the conveying elements, in accordance with the preferred example. The shaft 1 has a partial region B with first conveying elements 21, 22, 23, 24, 31, 32, 33, 34, 41, 42, 43, 44, 51, 52, 53, 54, 61, 62, 63, 64, 71, 72, which are spaced apart uniformly in the axial direction as well as the circumferential direction of the shaft 1. The angle of inclination of the conveying elements 21 to 72 in the partial region B of the shaft 1 is such, that one revolution of the shaft 1 about its longitudinal axis in the counterclockwise direction, looking in the product-conveying direction F, transports the product in the chamber 101 in the product-conveying direction F. In the region of the outlet and of the shaft 1, there is a further partial region A, in which further elements 2, 3, 4, 5, 6, 7, 8, 9, 10, 11, 12, 13, 14, 15 are disposed at the shaft 1. These further elements 2 to 15 in the outlet partial region A of the shaft 1 are disposed closer together than are the first conveying elements 21 to 72 of the partial region B of the shaft 1. Furthermore, the further elements 2 to 15 of the partial region A of the shaft 1 have different sizes, but are also constructed as conveying elements. Between the conveying element 10, which belongs to a crown of eight conveying elements 8, 9, 10, 11, 12, 13, 14, 15 and a conveying element 17, which is spaced apart axially in the conveying direction F, there is a web 16, which extends parallel to the axis of the shaft and connects the conveying element 10 and the conveying elements 17 at their radially outward regions.

FIG. 2 is a side view of the shaft 1, which is shown in FIG. 1. For reasons of clarity, not all of the further elements 2 to 15 of the partial region A of the shaft 1 were provided with reference numbers in FIG. 1.

FIG. 3 is an enlarged representation of the outlet side of the partial region A of the shaft 1.

As is evident from FIGS. 1, 2 and 3, the two diametrically opposite conveying elements 2 and 3, which form a division into two, that is, which are offset by 180° in the circumferential direction of the shaft 1, are located in partial region A. At a distance from these two conveying elements 2 and 3 in the conveying direction F, there is a crown of four conveying elements 4, 5, 6, 7, which are also distributed uniformly in the circumferential direction of the shaft 1 in accordance with a division into four, that is, they are disposed offset from one another by an angle of 90° in the circumferential direction of the shaft. At a distance from these in the conveying direction F, there is a terminal crown of eight conveying elements 8, 9, 10, 11, 12, 13, 14, 15, which form a division into eight parts, that is, the conveying elements 8 to 15 are disposed offset to one another by 45° in the circumferential direction of the shaft. In addition, the conveying elements 8 to 15 of this crown of eight parts are somewhat smaller than the remaining conveying elements 2 to 7 and 21 to 72. However, all the conveying elements 2 to 15 as well as 21 to 72 have the same radial extent and extend essentially up to the inner wall of the cylindrical chamber 101.

The first conveying elements 21 to 72 are disposed in divisions of four, that is, the elements are offset by 90° to another in the circumferential direction of the shaft. In addition, the first conveying elements 21 to 72 are distributed uniformly to one another in the axial direction of the shaft. The conveying elements 21, 22, 23, 24 form a first cyclic group, the conveying elements 31, 32, 33, 34 form a second cyclic group, the conveying elements 41, 42, 43, 44 form a third cyclic group, the conveying elements 51, 52, 53, 54 form a fourth cyclic group and the conveying elements 61, 62, 63, 64 form a fifth cyclic group. The two last conveying elements 71, 72 form an incomplete sixth cyclic group. The conveying elements of each cyclic group in the partial region B (see FIGS. 1 and 2) are disposed in such a manner that, in the axial direction of the shaft, adjacent conveying elements are offset by 90° in the circumferential direction of the shaft. If a product volume is transported a little further by the conveying elements 62 in the conveying direction F when the shaft 1 is rotating in the conveying operation, this product volume experiences a further transporting movement in the product-conveying direction F due to the conveying element 61 only after a 270° rotation of the shaft 1. This relationship with respect to the transporting effect of random product volumes is valid for all conveying elements 21 to 72 of the partial region B. Due to this relatively large angle of rotation of 270° between consecutive transporting effects on a random product volume in the conveying direction, a relatively weakly pronounced conveying action is achieved. In the interior of the cylindrical chamber 101 of the inventive conveying device, this leads to a very high degree of filling and a long residence time of the product.

In the partial region A, the further elements 2 to 15 are disposed much closer together than in the partial region B. In the conveying direction F, three different cyclic regions follow one another in the partial region A of the shaft. The first cyclic region of the partial region A consists of the conveying elements 2 and 3, the second cyclic region of the partial region A consists of the conveying elements 4, 5, 6, 7, and the third cyclic region A consists of the somewhat narrower conveying elements 8, 9, 10, 11, 12, 13, 14, 15.

When a flowable product is conveyed in the conveying direction F by the rotating shaft 1, periodically consecutive regions of a higher and a lower product density are formed in the partial region B. If these regions of the product filling, which are compacted more or less alternately in the conveying direction F of the product, were to be ejected from the cylindrical chamber 101 in a direction opposite to the conveying direction of the conveying element 21, the pulsating ejection movements, typically of this type of conveying or compacting, would develop. However, this pulsating ejection of product is now evened out by the conveying elements 2 to 15 in partial region A of the shaft 1 at the outlet side. The plug-like accumulations of flowable product, originating from the partial region B are namely divided gradually by the conveying elements 2 to 15, which are disposed relatively close together, and distributed in this partial region A in the axial direction as well as in the circumferential direction. This leads to an evening out or smoothing of the pulsating ejection of product. The web, connecting the peripheral regions of the conveying elements 10 and 17, functions as a scraper for scraping off product, which may adhere to the inner wall of the cylindrical chamber in the outlet region.

FIG. 4 is a further view of the shaft of FIG. 1 in a position, rotated through 270° in the conveying direction of the shaft 1 in comparison to the side view of FIG. 2. In addition, the shaft 1 and all conveying elements of the partial region A (see FIGS. 1, 2 and 3) are shown transparent, so that all visible edges of all conveying elements can be recognized. For a better illustration of the example of the inventive shaft, four sectional planes, A-A, B-B, C-C and D-D are shown in FIGS. 4A-4D perpendicularly to the axis of the shaft to supplement the perspective views and the side view of FIGS. 1, 2 and 3. If the inventive shaft 1 with its conveying elements is viewed along the sectional plane A-A of the product-conveying redirection F (see FIG. 4A, the partial sectional eight conveying elements 8, 9, 10, 11, 12, 13, 14, 15 as well as the sectional shaft 1 are recognized. If the inventive shaft is viewed along the sectional plane B-B in the product-conveying direction F, the four conveying elements 4, 5, 6, 7, which form a division into four, in front of the eight conveying elements 8 to 15 of the division into eight, which can be seen in the sectional plane A-A, are recognized. A portion of the conveying element 14 can be seen behind the conveying element 4, a portion of the conveying element 8 can be seen behind the conveying element 5, a portion of the conveying element 10 can be seen behind the conveying element 6 and a portion of the conveying element 12 can be seen behind the conveying element 7.

If the inventive shaft is viewed along the sectional plane C-C counter to the product-conveying direction F (see FIG. 1), the partially sectional conveying element 31, the conveying elements 32, the conveying element 33 and the conveying elements 34 are recognized, which together form a cyclic unit of the conveying elements 21 to 72 of the partial region B, which are disposed as a division into four. Finally, if the inventive shaft is viewed along the sectional plane D-D, the partial conveying element 71 and the somewhat smaller conveying element 72 are recognized.

In the case of the example of the inventive shaft of FIGS. 1 to 4, it can be seen that an evening out or smoothing of the product ejected at the outlet of the inventive conveying device is achieved by the 270° angular offset of the conveying elements in the partial region B as well as by the conveying elements in the partial region A, which exert a dividing and distributing effect on product accumulations.

In somewhat different words, the mode of action of the inventive conveying device can be described in the following way. In the partial region B, the conveying elements 21 to 72 are disposed along a helical line winding uniformly about the shaft 1, as can be seen best in FIGS. 1 and 2. If a continuous web were to be formed along this helical line, it would convey the product to the right, looking in the product-conveying direction F, if the shaft 1 is rotated counterclockwise about its axis. However, since this imaginary, rearward-conveying flight is formed discontinuously by the conveying elements 21 to 72, the angle of inclination of which brings about a conveying counter to the conveying direction of the imaginary, continuous flight, there is a relatively weak conveying effect in the product-conveying direction F in the partial region B of the shaft 1. Between this discontinuous web or quasi web, product accumulations or plugs are formed, the dimensions of which correspond approximately to the width of the quasi flight between the discontinuous web or the quasi web. At the end region of the shaft 1 at the outlet side, there are additional elements 2 to 15 in this quasi flight, which are also constructed as conveying elements, in order to divide and distribute these product accumulations. The conveying elements 21 to 72 of the partial region B, arranged in division of four, form a quasi web with a relatively steep slope, whereas the dividing and distributing, additional conveying elements 8 to 15 form three parallel quasi webs without a slope. The first discontinuous quasi web without a slope consists of conveying elements 2 and 3, which are arranged in a division into two. The second discontinuous quasi web without a slope consists of the conveying elements 4, 5, 6, 7, which are arranged in a division of four, and the third discontinuous quasi web consists of the conveying elements 8, 9, 10, 11, 12, 13, 14, 15, which are disposed in a division of eight without a slope.

In the case of the present example, the bulk of the evening out to smoothing of the product ejection is achieved at the outlet side by dividing and distributing the product accumulations formed in the partial region B. The 270° offset of the conveying elements in the partial region B also has a smoothing effect in addition to this smoothing effect in the partial region A.

Of course, the invention can also be realized with other divisions in the partial region B and in the partial region A. Instead of the division into four, for which the conveying elements are disposed in a cyclic group at the angular positions of 90°, 180°, 270° and 360°, divisions into five, six, seven and eight can also be realized. However, the number of conveying elements, which can be used, is limited by the necessary volume, which is lost by the process space.

The invention claimed is:

1. Conveying device for transporting a conveyable product, comprising:
    an essentially cylindrical axially extending chamber,
    at least one axially extending shaft disposed in said chamber which extends along the axis of the chamber,
    said shaft having a plurality of first conveying elements axially spaced from one another to form a discontinuous web, the conveying elements being axially spaced discrete paddles or beaters;
    said first conveying elements transporting the product in an axially extending product-conveying direction,
    said first conveying elements extending radially from the shaft and being connected with the shaft in each case at a connecting site on the surface of the shaft,
    the individual connecting sites being disposed along a helical line at the surface of the shaft,
    the plurality of first conveying elements forming a first flight corresponding to the helical line which extends helically about the surface of the shaft,
    the first flight disposed along a plurality of revolutions about said shaft at a first helical pitch,
    the first flight being divided into at least two axially spaced partial flights at least in axially spaced partial regions of said shaft,
    each partial flight including a plurality of said axially spaced discrete paddles or beaters,
    further elements in a further element section, the further element section disposed along at least one revolution about said shaft at a second helical pitch that is smaller than the first helical pitch,
    the number of further elements disposed along said at least one revolution about said shaft in said further element section being greater than the number of elements disposed along each revolution about said shaft in said first flight,
    the further element section axially protruding into the first flight disposed at least in partial regions of the first flight,
    the further elements in the further element section forming at least one further, discontinuous web, which extends along and within the first flight, and
    the number of further discontinuous webs and, with that, the number of partial flights increasing in the product-conveying direction.

2. The conveying device of claim 1, wherein the further elements also are conveying elements for transporting product.

3. The conveying device claim 1, wherein the regions with a larger number and regions with a smaller number of discontinuous webs follow one another in the product-conveying direction.

4. The conveying device of claim 1, wherein the regions with an increasing number and regions with a decreasing number of discontinuous webs follow one another in the product-conveying direction.

5. The conveying device of claim 1, wherein the slope of the first flight increases in the product-conveying direction.

6. The conveying device of claim 1, wherein regions with a greater slope and regions with a lesser slope of the first flight follow one another in the product-conveying direction.

7. The conveying device of claim 1, wherein regions with an increasing slope and regions with a decreasing slope of the first flight follow one another in the product-conveying direction.

8. The conveying device of claim 1, wherein the first conveying elements, connected along the helical line on the surface of the shaft with the shaft and forming the first discontinuous web, and the further elements, disposed at least in partial regions of the first flight, are disposed in such a manner that a product volume, which is contained in the cylindrical chamber and, because of a rotation of the shaft, is moved a short distance further by means of one of the first conveying elements in the product-conveying direction on a product path in the chamber, is divided and moved apart by at least one element of the further elements crossing the product path, before this product volume is taken hold of and moved further by at least one other of the first conveying elements.

9. The conveying device of claim 1, wherein the first conveying elements are disposed at the shaft in such a manner, that the place, to which the product volume is shifted in the product-conveying direction by contact with one of the first conveying elements because of the rotation of the shaft, after a particular first angle of a rotation of the shaft, comes into contact with another of the first conveying elements further downstream, in order to be shifted further in the product-conveying direction.

10. The conveying device of claim 1, wherein the number of flights in the product-conveying direction increases from one flight up to a maximum of eight flights.

11. The product-conveying device of claim 1, wherein the axially adjacent conveying elements are disposed at the shaft offset by 90° to one another (90° division).

12. The conveying device of claim 11, wherein the specific angle of rotation is equal to or greater than 90°.

13. The conveying device of claim 11, wherein the further elements at the shaft are disposed in such a manner, that the place to which a portion of the product volume is shifted in the product-conveying direction by contact with one of the further conveying elements because of the rotation of the shaft, after a particular, further angle of a rotation of the shaft, comes into contact with another of the further elements further downstream, in order to be shifted further in the product-conveying direction, the further angle of rotation being smaller than the first angle of rotation.

14. The product-conveying device of claim 1, wherein the axially adjacent conveying elements are disposed at the shaft offset by an angle that is equal to or greater than 180°.

15. The product-conveying device of claim 1, wherein the axially adjacent conveying elements are disposed at the shaft offset by an angle that is equal to or greater than 270°.

16. The conveying device of claim 1, wherein regions with a different number of conveying elements are determined by the first conveying elements and the further conveying elements in the product-conveying direction at the shaft.

17. The conveying device of claim 16, wherein the number of conveying elements increases in the product-conveying direction.

18. The product-conveying device of claim 17, wherein the number of conveying elements at the shaft is doubled from a first axial section to a downstream adjacent further section of the shaft in the product-conveying direction.

19. The conveying device of claim 17, wherein the number of conveying elements at the shaft increases in each case by one quasi flight from a first axial section of the shaft to a downstream adjacent further section of the shaft in the product-conveying direction.

20. Preconditioner for preconditioning a flowable product, comprising:
an essentially axially extending cylindrical chamber,
at least one axially extending shaft in said chamber which extends along the axis of the chamber,
said shaft having a plurality of first conveying elements axially spaced from one another to form a discontinuous web,
said first conveying elements transporting the product in an axially extending product-conveying direction,
said first conveying elements extending radially from the shaft and being connected with the shaft in each case at a connecting site on the surface of the shaft,
the individual connecting sites being disposed along a helical line at the surface of the shaft,
the plurality of first conveying elements forming a first flight corresponding to the helical line which extends helically about the surface of the shaft,
the first flight disposed along a plurality of revolutions about said shaft at a first helical pitch,
the first flight being divided into at least two axially spaced partial flights at least in axially spaced partial regions of said shaft,
each partial flight including a plurality of said axially spaced discrete paddles or beaters,
further elements in a further element section, the further element section disposed along at least one revolution about said shaft at a second helical pitch that is smaller than the first helical pitch,
the number of further elements disposed along said at least one revolution about said shaft in said further element section being greater than the number of elements disposed along each revolution about said shaft in said first flight,
the further element section axially protruding into the first flight disposed at least in partial regions of the first flight,
the further elements in the further element section forming at least one further, discontinuous web, which extends along and within the first flight, and
the number of further discontinuous webs and, with that, the number of partial flights increasing in the product-conveying direction.

21. Method for transporting a conveyable, especially a pourable product by means of the conveying device of claim 1, comprising:
rotating the shaft such that:
a product volume, contained in the cylindrical chamber, is moved a short distance further by a conveying element of the first group of conveying elements in the product-conveying direction on a product path in the chamber; and
the product volume is divided and moved apart by at least one element of a group of further elements crossing the product path; and
at least a portion of this product volume is taken hold of and moved further by at least one other of the first conveying elements.

* * * * *